US012270345B2

(12) United States Patent
Gover

(10) Patent No.: US 12,270,345 B2
(45) Date of Patent: Apr. 8, 2025

(54) CONTAINMENT ASSEMBLY FOR AN AIRCRAFT ENGINE

(71) Applicant: PRATT & WHITNEY CANADA CORP., Longueuil (CA)

(72) Inventor: Christopher Gover, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 17 days.

(21) Appl. No.: 17/806,161

(22) Filed: Jun. 9, 2022

(65) Prior Publication Data

US 2023/0399981 A1 Dec. 14, 2023

(51) Int. Cl.
| | |
|---|---|
| *F02C 7/24* | (2006.01) |
| *F01D 21/04* | (2006.01) |
| *F01D 25/14* | (2006.01) |
| *F01D 11/24* | (2006.01) |

(52) U.S. Cl.
CPC .............. *F02C 7/24* (2013.01); *F01D 21/045* (2013.01); *F01D 25/145* (2013.01); *F01D 11/24* (2013.01); *F05D 2220/323* (2013.01); *F05D 2240/15* (2013.01); *F05D 2300/121* (2013.01); *F05D 2300/133* (2013.01); *F05D 2300/603* (2013.01)

(58) Field of Classification Search
CPC ...... F01D 21/045; F01D 25/145; F01D 11/24; F02C 7/24; F05D 2240/15; F05D 2220/323; F05D 2300/121; F05D 2300/133; F05D 2300/603
See application file for complete search history.

(56) References Cited

U.S. PATENT DOCUMENTS

| | | | | |
|---|---|---|---|---|
| 4,525,998 | A | * | 7/1985 | Schwarz ................. F01D 11/24 415/138 |
| 4,543,039 | A | * | 9/1985 | Ruis ........................ F01D 9/041 415/173.1 |
| 4,925,365 | A | | 5/1990 | Crozet et al. |
| 5,724,643 | A | * | 3/1998 | Ewing ..................... C22C 14/00 419/49 |
| 6,120,242 | A | * | 9/2000 | Bonnoitt ............... F01D 21/045 415/174.4 |
| 6,468,026 | B1 | | 10/2002 | Bonnoitt et al. |
| 10,422,247 | B2 | | 9/2019 | Kufner et al. |
| 10,563,535 | B2 | | 2/2020 | Vetters et al. |

(Continued)

FOREIGN PATENT DOCUMENTS

JP 2001123995 5/2001

OTHER PUBLICATIONS

J.R Davis, Alloying: Understanding the Basics, 2001, ASM International, p. 351 (Year: 2001).*

(Continued)

*Primary Examiner* — Michael K. Reitz
(74) *Attorney, Agent, or Firm* — NORTON ROSE FULBRIGHT CANADA LLP

(57) ABSTRACT

A containment assembly is provided for an aircraft engine having a rotor with a set of blades. The containment assembly comprises a containment casing annularly surrounding the rotor radially outward of the set of blades. The containment casing is made of a material having a density less than that of steel. A layer of thermal insulation is disposed radially inward of the containment casing. The layer of thermal insulation is radially disposed between the containment casing and the set of blades.

10 Claims, 3 Drawing Sheets

(56) References Cited

U.S. PATENT DOCUMENTS

| | | | | |
|---|---|---|---|---|
| 2004/0022625 | A1* | 2/2004 | Care | F01D 11/122 |
| | | | | 415/173.3 |
| 2010/0074745 | A1* | 3/2010 | Jones | F01D 25/246 |
| | | | | 415/209.3 |
| 2011/0259677 | A1* | 10/2011 | Dudde | D07B 5/006 |
| | | | | 187/411 |
| 2011/0286839 | A1* | 11/2011 | Wojtyczka | F01D 21/045 |
| | | | | 415/173.4 |
| 2012/0247121 | A1* | 10/2012 | Kitamura | F02C 7/18 |
| | | | | 60/785 |
| 2015/0152745 | A1* | 6/2015 | Countandin | F01D 25/12 |
| | | | | 415/177 |
| 2015/0345326 | A1 | 12/2015 | Robertson, Jr. et al. | |
| 2016/0341070 | A1* | 11/2016 | Garcia | F04D 29/023 |
| 2018/0230855 | A1 | 8/2018 | Heeter | |
| 2021/0102475 | A1 | 4/2021 | Crall et al. | |
| 2022/0120197 | A1 | 4/2022 | Lefebvre et al. | |
| 2022/0307388 | A1* | 9/2022 | Kray | F01D 25/24 |
| 2022/0341345 | A1* | 10/2022 | Vanapalli | F01D 25/12 |
| 2023/0304415 | A1* | 9/2023 | Zheng | F01D 9/04 |
| | | | | 415/173.2 |

OTHER PUBLICATIONS

Kevlar Aramid Fiber Technical Guide, 2017, Dupont (Year: 2017).*
EML2322L—Materials and Material Selection, 2015 (Year: 2015).*
European Search Report issued on Oct. 19, 2023 for corresponding application 23178292.1.

* cited by examiner

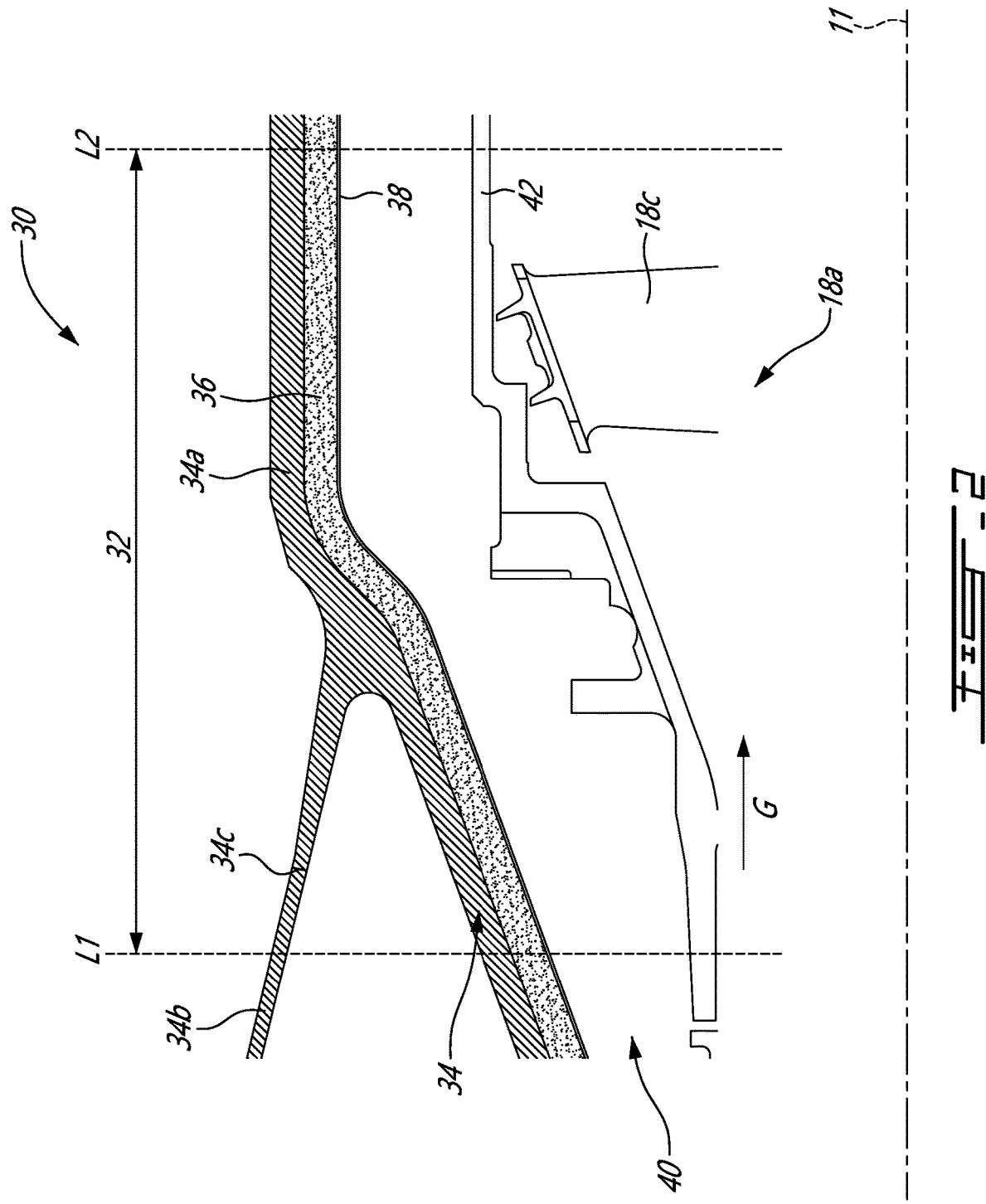

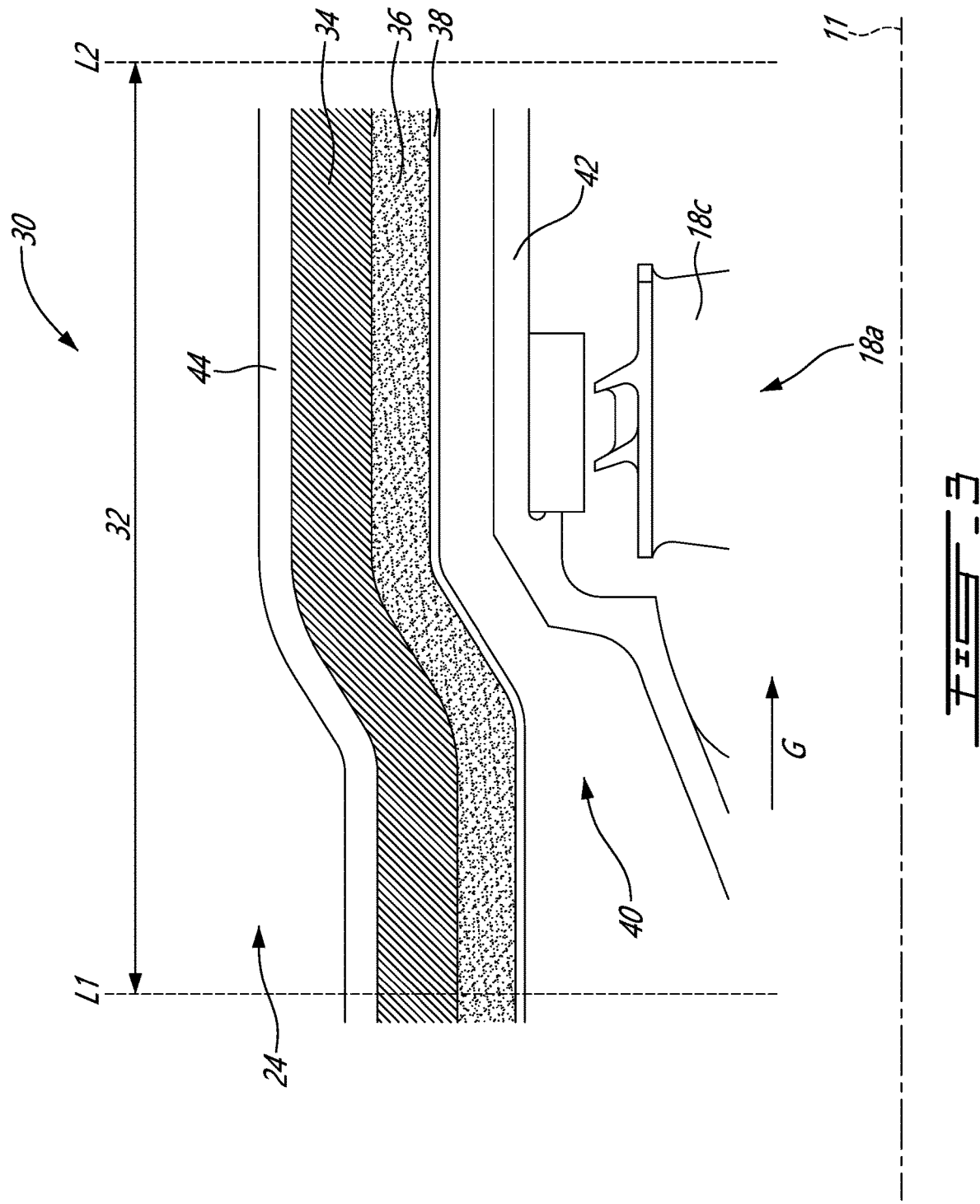

CONTAINMENT ASSEMBLY FOR AN AIRCRAFT ENGINE

TECHNICAL FIELD

The disclosure relates generally to aircraft engines, and, more particularly, to containment structures for aircraft engines.

BACKGROUND

In an aircraft engine, such as a gas turbine engine, portions of the engine case surrounding bladed rotors need to be reinforced to preserve the integrity of the case should, for instance, a blade, a blade fragment or other rotating components fail and become detached during operation of the engine (sometimes referred to as a blade-off event). Particularly in the turbine section of such engines, the portion of the engine case surrounding the turbine rotors is typically made of metals with high densities that can withstand the high temperatures to which they are exposed in the hot section of such engines. This can result in a heavy containment structure within the turbine section. While suitable for their intended purposes, improvements are sought to reduce the weight of containment structures.

SUMMARY

In one aspect, there is provided a containment assembly for an aircraft engine having a rotor with a set of blades, the containment assembly comprising: a containment casing annularly surrounding the rotor radially outward of the set of blades, the containment casing made of a material having a density less than that of steel; and a layer of thermal insulation disposed radially inward of the containment casing, the layer of thermal insulation being radially disposed between the containment casing and the set of blades.

The containment assembly as defined above and described herein may further include one or more of the following additional features, in whole or in part, and in any combination.

In certain embodiments, the containment casing is made from a composite material.

In certain embodiments, the containment casing is made from one or more of a carbon composite, a KEVLAR® composite, and para-aramid.

In certain embodiments, the containment casing is made from aluminum, titanium, or alloys thereof.

In certain embodiments, the density of the material of the containment casing is less than 0.200 lb/in$^3$. Alternately, the density of the material of the containment casing may be less than 0.150 lb/in$^3$, and more alternately still, may be less than 0.100 lb/in$^3$.

In certain embodiments, the layer of thermal insulation is disposed directly against the containment casing.

In certain embodiments, comprising a face sheet disposed radially inward of the layer of insulating material.

In certain embodiments, the face sheet is a metallic face sheet.

In certain embodiments, the layer of thermal insulation includes two or more layers of thermal insulation, wherein a radially innermost layer of the two or more layers of thermal insulation is a resilient protective layer.

In certain embodiments, the containment casing is integrated with a core casing of the aircraft engine.

In another aspect, there is provided an aircraft engine comprising: a turbine including a turbine rotor having a set of turbine blades mounted for rotation about an axis; and a turbine case surrounding the set of turbine blades, the turbine case having a containment zone extending axially from a first location on a first side of the turbine rotor to a second location on a second opposed side of the turbine rotor, the turbine case including a containment casing annularly surrounding the turbine rotor radially outward of the set of turbine blades, the containment casing made of a material having a density less than that of steel, and a layer of thermal insulation disposed radially inward of the containment casing, the layer of thermal insulation being radially disposed between the containment casing and the set of rotor blades.

The aircraft engine as defined above and described herein may further include one or more of the following additional features, in whole or in part, and in any combination.

In certain embodiments, the containment casing is made from a composite material.

In certain embodiments, the containment casing is made from one or more of a carbon composite, a KEVLAR® composite, and para-aramid.

In certain embodiments, the containment casing is made from aluminum, titanium or alloys thereof.

In certain embodiments, the density of the material of the containment casing is less than 0.200 lb/in$^3$. Alternately, the density of the material of the containment casing may be less than 0.150 lb/in$^3$, and more alternately still, may be less than 0.100 lb/in$^3$.

In certain embodiments, comprising an air plenum radially disposed between the layer of thermal insulation and the set of blades.

In certain embodiments, comprising a face sheet disposed radially inwardly of the layer of insulating material.

In certain embodiments, the layer of thermal insulation includes two or more layers of thermal insulation, wherein a radially innermost layer of the two or more layers of thermal insulation is a resilient protective layer.

In certain embodiments, the containment casing is integrated with the turbine case.

In another aspect, there is provided a method of manufacturing a containment assembly for an aircraft engine, comprising: providing a containment casing annularly surrounding a set of rotor blades in a containment zone of the aircraft engine, the containment casing made of a material having a density less than that of steel; and positioning a layer of thermal insulation radially inward of the containment casing, the layer of thermal insulation being radially disposed between the containment casing and the set of rotor blades.

BRIEF DESCRIPTION OF THE DRAWINGS

Reference is now made to the accompanying figures in which:

FIG. 2 is an enlarged schematic cross sectional view of a stage of turbine blades surrounded by a containment assembly in a containment zone; and FIG. 3 is an enlarged schematic cross sectional view of a stage of turbine blades surrounded by another containment assembly in a containment zone.

DETAILED DESCRIPTION

Figure 1:
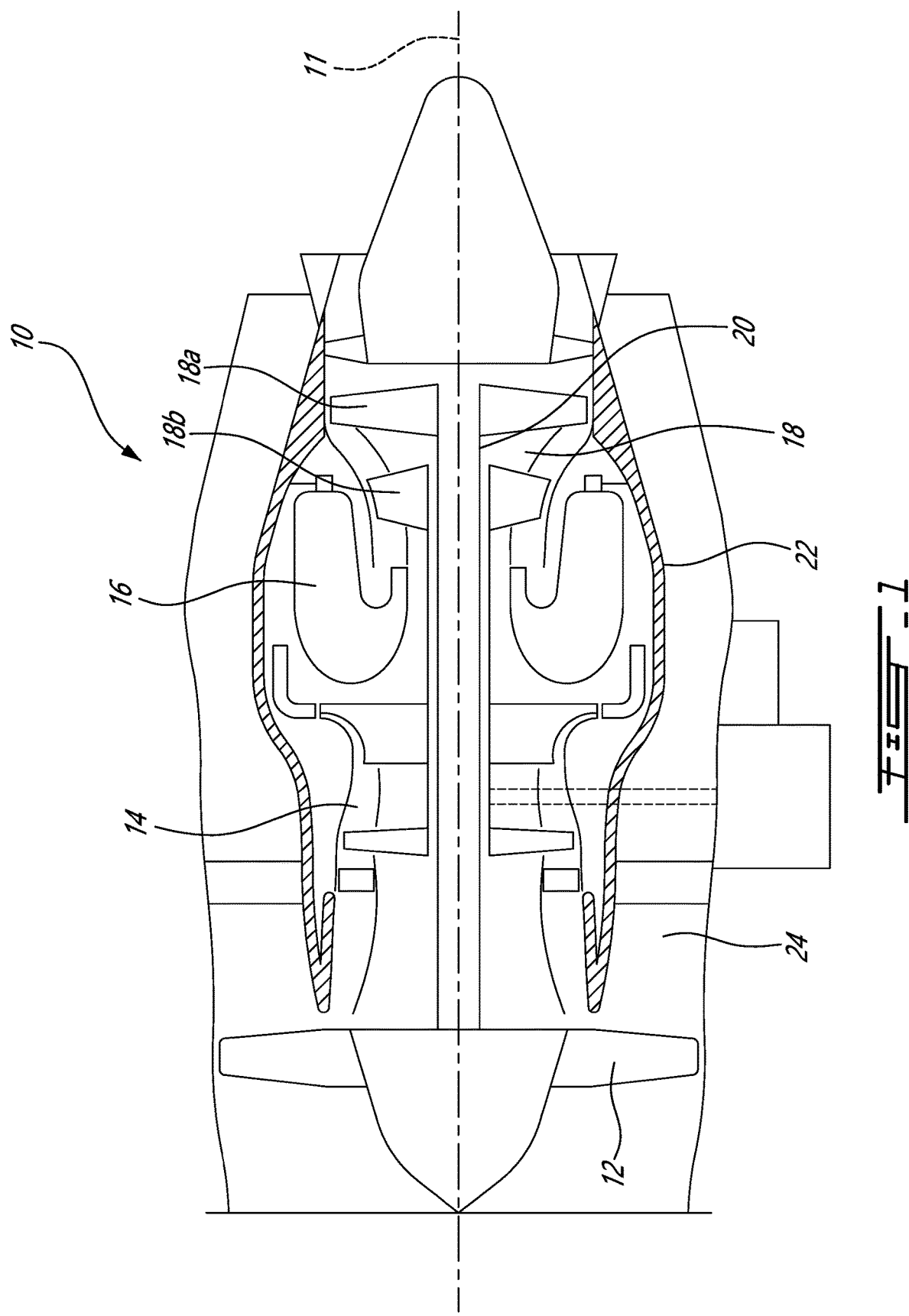
FIG. 1 is a schematic cross sectional view of a gas turbine engine.

FIG. 1 illustrates a gas turbine engine 10 with central axis 11 of a type provided for use, for instance, in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The turbine section 18 illustratively includes a low pressure or power turbine 18a and a high pressure turbine 18b. The low pressure turbine 18a may be configured to drive a rotatable load, illustratively fan 12, for instance via low pressure shaft 20 and a reduction gearbox (not shown). In other cases, the rotatable load can, for instance, take the form of a propeller or a rotor, such as a helicopter main rotor. The gas turbine engine 10 has an engine centerline 11. According to the illustrated embodiment, the compressor and the turbine rotors are mounted in-line for rotation about the engine centerline 11 (also referred to as engine central axis 11).

The engine 10 has an axially extending central core 22 which defines an annular gas path through which gases flow. In the depicted embodiment, the core 22 is surrounded by a bypass duct 24. The exemplary embodiment shown in FIG. 1 is a "through-flow" engine because gases flow in a direction opposite to a direction of travel of the aircraft. However, it is understood that an engine according to the present disclosure could adopt different configurations, including a reverse-flow configuration, the engine configuration illustrated in FIG. 1 being provided for context purposes only.

Although illustrated as a turbofan engine, the gas turbine engine 10 may alternatively be another type of aircraft engine, for example a turboshaft engine, also generally comprising in serial flow communication a compressor section, a combustor, and a turbine section, and a fan through which ambient air is propelled. A turboprop engine may also apply.

FIG. 2 is a partial view of the turbine section 18 of FIG. 1. As will be seen herein below, FIG. 2 illustrates an example of the engine's case assembly in a containment zone of the engine 10. In gas turbine engines, the portion of the engine case surrounding bladed rotors mounted for rotation about axis 11, such as turbine rotors, is reinforced to contain blade fragments or blades and preserve the structural integrity of the case in the event of a blade ejection event (partial or full). In addition, the hot portions of the gas turbine engines, i.e., the combustor 16 and turbine section 18, may further require thermal insulation in the casing so that the engine 10 may withstand the high temperatures contained within. For instance, the exterior surfaces of the core 22 may be required to be kept at certain temperatures to be deemed acceptable for the proper functioning of surrounding hardware and to meet fire safety standards.

In the particular example shown in FIG. 2, the case assembly (also referred to as turbine case) in the containment zone may be referred to as a containment assembly 30, which is configured to prevent any fragments or a full blade from being able to breach the containment assembly in the event of a blade release event. The containment assembly 30 may extend about a containment zone 32 which, as used herein, is defined as a zone extending both axially and circumferentially around where a turbine blade or blade fragment is most likely to be ejected from the bladed rotor (e.g. the power turbine 18a). According to one aspect, the containment zone 32 has a longitudinal length that is at least sufficient to enclose the turbine blades 18c of the power turbine 18a. The span of the containment zone 32 can vary, for instance depending on the engine operating parameters and design. The containment zone 32 may extend axially from a first location L1 on a first side of the turbine section 18 to a second location L2 on a second side of the turbine section 18. In other cases, the containment zone 32 may extend about an axial length the high pressure turbine 18b. Similarly, the containment zone 32 may extend about an axial length of the entire turbine section 18, for instance including both the high pressure turbine 18b and power turbine 18a. In some cases, engine 10 may include multiple containment zones 32 which may or may not overlap with one another. Other regions for containment zone 32 may be contemplated.

Still referring to FIG. 2, it can be seen that the containment assembly 30 has an annular containment casing 34 spanning an axial length of the containment zone 32. Accordingly, this containment casing 34 is operable to perform the required containment function, i.e., to contain any fragments which may be released and cause damage to surrounding hardware in the event of a failure of a rotating component such as a turbine blade 18c. The containment casing 34 may additionally be operable to transfer various loads on or around the engine 10. By "annular", it is understood that the containment casing 34 completely surrounds the rotating component about the axis 11 and thus is operable to perform its containment function regardless of the direction of a blade release. Various shapes for annular containment casing 34 may be contemplated, such as cylindrical.

In the embodiment shown in FIG. 2, the exemplified containment casing 34 includes a first casing member 34a and a second casing member 34b welded to the first casing member 34a at a weld joint 34c located within the containment zone 32. In some cases, the first casing member 34a may be configured to protect/shield the weld joint 34c from the blades 18c in the event of a blade off event, thereby allowing the provision of a weld joint or another weakened feature (e.g. a hole or the like) in the containment zone 32. Various materials may be contemplated for the containment casing 34, as will be discussed in further detail below.

Still referring to FIG. 2, a layer of insulating material 36, also referred to as a layer of thermal insulation, is disposed radially inwardly of the containment casing 34. Stated differently, the layer of insulating material 36 is disposed radially between the containment casing 34 and the rotating blades 18c. The layer of insulating material 36 is operable to control the temperatures within the core 22 of the engine 10 and provide the containment assembly 30 with an acceptable thermal environment based on the various thermal limitations of the different materials. The thickness, density and material of the layer of insulating material 36 thus may vary based on, for instance, the type of engine 10, the size of the engine 10, the specific temperature requirements of engine 10, the turbine state that the layer of insulating material 36 surrounds, etc. In some cases, multiple layers of insulating material 36 may be present, for instanced stacked layers or radially-separated layers.

In the embodiment shown in FIG. 2, the layer of insulating material 36 and the containment casing 34 are shown to be disposed directly against one another. Alternatively, a radial spacing may be left between the layer of insulating material 36 and the containment casing 34. In an exemplary assembly process, the layer of insulating material 36 may be bonded to the containment casing 34, for instance via an adhesive, before the containment casing 34 is mounted or installed within the engine 10. In such cases, the layer of insulating material 36 and the containment casing 34 may be considered to be integrated as a single piece or layer.

FIG. 2 shows an optional face sheet 38 disposed against the layer of insulating material 36 on a radially inner side thereof. This face sheet 38 may be added to protect the layer of insulating material 36 from fluids or possible handling damage. For instance, in the embodiment shown in FIG. 2, an air plenum 40 is disposed between the layer of insulating material 36 and a gas path structure 42 (for instance a vane structure) surrounding the turbine blades 18c. Air flowing through the air plenum 40 may provide additional thermal insulation for the core 22, and in such cases the face sheet 38 may be provided to protect the layer of insulating material 36 from the surrounding airflow. In other cases, the face sheet 38 may be omitted, for instance if no air is flowing through plenum 40. Alternatively, multiple layers of insulating material 36 may be provided, with the radially innermost layer being a protective layer, being more resilient and having protective properties. In the shown case, the face sheet 38 is metallic, although non-metallic materials for the face sheet 38, for instance a high temperature composite, may be contemplated as well.

As discussed above, the layer of insulating material 36 is radially closer to the turbine blades 18c, and thus to the hot gas path G flowing through the core 22 of the engine 10, than the containment casing 34. Accordingly, unlike conventional containment configurations, the insulating material 36 is located radially within the surrounding containment casing 34 (or stated differently, the containment casing 34 is located radially outward of the layer of insulating material 36), rather than the other way around. As such, the containment casing 34 may not be required to withstand as high temperatures, because of the presence of the insulating material 36 on the inside of the containment casing 34, which thermally insulates the containment casing 34 from the high temperatures within the turbine section 18. Because the containment casing 34 does not need to withstand as high temperatures, the containment casing 34 may thus be made from various lightweight and/or lower density materials-relative to the more dense and heavier metallic materials typically used for containment casings. The less dense (and thus lower weight) material used for the present containment casing 34, formed for example in a monolithic or multi-material configuration, accordingly provides the casing with sufficient containment properties in the case of a blade, fragment or other component release event, but need not be required to directly withstand the high temperatures of the turbine section 18—due to the presence of the internal thermal insulating material 36. The containment casing 34 is accordingly made of lightweight and/or lower density materials that may include, for instance, composite materials or light-weight metals or metal alloys. Examples of composite materials that the containment casing 34 may be made of include, but are not limited to, carbon composites, KEVLAR® composites and para-aramid composites. Examples of light-weight metallic materials that the containment casing 34 may be made of include, but are not limited to, aluminum and alloys thereof, and titanium and alloys thereof. Other lightweight and/or lower density materials for the containment casing 34 may be contemplated. By "lightweight" and "lower density", as used herein with respect to the containment casing 34, it is understood that the weight and/or density of the material(s) selected for the containment casing 34 are lower than those of a typical metal containment casing (made for example of nickel, cobalt or steel, or alloys thereof).

Thus, in a particular embodiment of the present disclosure, the containing casing 34 is made of a material that has a density that is less than that of steel, i.e., less than approximately 0.280 lb/in$^3$. The density of the containment casing 34 is therefore also less than the densities of other, even more dense—and therefore heavier—metals, such as nickel alloys (typically having densities of approximately 0.298 lb/in$^3$) and cobalt alloys (typically having densities of approximately 0.305 lb/in$^3$). In a particular embodiment, the density of the present containment casing 34 is less than 0.200 lb/in$^3$. In another embodiment, the density of the containment casing 34 is less than 0.150 lb/in$^3$. In another embodiment, the density of the containment casing 34 is less than 0.100 lb/in$^3$. Other density ranges for the containment casing 34 may be contemplated. In other words, the same containment capacity may be provided while lowering the overall weight of the containment assembly 30 and, thus, of the engine 10.

Referring to FIG. 3, another embodiment of a containment assembly 30 is shown, with like reference numerals referring to like components. In this embodiment, the primary structure 44 of the engine 10, also referred to as the core casing 44, surrounds the containment casing 34. Stated differently, the core casing 44 is disposed radially outwardly of the containment casing 34 and defines the outermost portion of the central core 22, with the bypass duct 24 disposed radially outwardly thereof. The core casing 44 may surround the entirely of the central core 22, with the containment casing 34 disposed solely around the portion(s) of the central core 22 (e.g. the turbine section 18) where the containment function may be required, i.e., in the containment zone(s) 32. In some cases, the containment casing 34 may be combined or integrated with the core casing 44 in the containment zone(s) 32.

According to at least some embodiments, it can be appreciated that a containment casing for a hot section of an aircraft engine may be disposed radially outwardly of a layer of thermal insulation, thereby subjecting the containment casing to lesser temperatures and allowing the containment casing to be made from lighter materials.

In accordance with another aspect, there is provided a method of manufacturing a containment assembly for an aircraft engine, comprising: providing a containment casing surrounding a set of rotor blades in a containment zone of the aircraft engine, and providing a layer of thermal insulation radially between of the containment casing and surrounding the set of rotor blades.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the density of the material of the containment casing being less than 0.200 lb/in$^3$), include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A containment assembly for an aircraft engine having a rotor with a set of blades, the containment assembly comprising:
   a containment casing annularly surrounding the rotor radially outward of the set of blades, the containment casing made of a material having a density less than that of steel;
   a layer of thermal insulation disposed radially inward of the containment casing, the layer of thermal insulation being radially disposed between the containment casing and the set of blades;
   a face sheet disposed radially inward of the layer of thermal insulation;
   a gas path structure surrounding the set of blades, the gas path structure disposed radially inward of the layer of thermal insulation; and
   an air plenum radially disposed between the layer of thermal insulation and the gas path structure, wherein an air flow is operable to flow through the air plenum;
   wherein the layer of thermal insulation is disposed directly and concentrically against the containment casing; and
   wherein the containment casing is made from a composite material.

2. The containment assembly as defined in claim 1, wherein the containment casing is made from one or more of a carbon composite, a poly-para-phenylene terephthalamide composite, and para-aramid.

3. The containment assembly as defined in claim 1, wherein the density of the material of the containment casing is less than 0.200 lb/in$^3$.

4. The containment assembly as defined in claim 1, wherein the face sheet is a metallic face sheet.

5. The containment assembly as defined in claim 1, wherein the containment casing is integrated with a core casing of the aircraft engine.

6. An aircraft engine comprising:
   a turbine including a turbine rotor having a set of turbine blades mounted for rotation about an axis; and
   a turbine case surrounding the set of turbine blades, the turbine case having a containment zone extending axially from a first location on a first side of the turbine rotor to a second location on a second opposed side of the turbine rotor, the turbine case including a containment casing annularly surrounding the turbine rotor radially outward of the set of turbine blades, the containment casing made of a material having a density less than that of steel, and a layer of thermal insulation disposed radially inward of the containment casing, the layer of thermal insulation being radially disposed between the containment casing and the set of turbine blades, the turbine case further including a gas path structure surrounding the set of turbine blades, the gas path structure disposed radially inward of the layer of thermal insulation, and an air plenum radially disposed between the layer of thermal insulation and the gas path structure, wherein an air flow is operable to flow through the air plenum, wherein the layer of thermal insulation is disposed directly and concentrically against the containment casing, wherein the containment casing is made from a composite material, wherein the layer of thermal insulation includes two or more layers of thermal insulation, wherein a radially innermost layer of the two or more layers of thermal insulation is a resilient protective layer.

7. The aircraft engine as defined in claim 6, wherein the containment casing is made from one or more of a carbon composite, a poly-para-phenylene terephthalamide composite, and para-aramid.

8. The aircraft engine as defined in claim 6, wherein the density of the material of the containment casing is less than 0.200 lb/in$^3$.

9. The aircraft engine as defined in claim 6, wherein the containment casing is integrated with the turbine case.

10. A method of manufacturing a containment assembly for an aircraft engine, comprising:
   providing a containment casing annularly surrounding a set of rotor blades in a containment zone of the aircraft engine, the containment casing made of a composite material having a density less than that of steel, the set of rotor blades radially surrounded by a gas path structure;
   positioning a layer of thermal insulation radially inward of the containment casing and radially outward of the gas path structure, the layer of thermal insulation being radially disposed between the containment casing and the set of rotor blades, wherein the layer of thermal insulation disposed directly and concentrically against the containment casing, wherein a face sheet is disposed radially inwardly of the layer of thermal insulation; and
   providing an air plenum radially disposed between the layer of thermal insulation and the gas path structure, wherein an air flow is operable to flow through the air plenum.

* * * * *